(12) United States Patent
Schaab et al.

(10) Patent No.: US 8,918,255 B2
(45) Date of Patent: Dec. 23, 2014

(54) METHOD FOR PREVENTING A COLLISION OF A VEHICLE AND DRIVER ASSISTANCE SYSTEM FOR A VEHICLE

(75) Inventors: Alexander Schaab, Sindelfingen (DE); Alfred Kloos, Weissach (DE); Walter Ziegler, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/126,290

(22) PCT Filed: Dec. 15, 2011

(86) PCT No.: PCT/EP2011/006337
§ 371 (c)(1),
(2), (4) Date: Jan. 31, 2014

(87) PCT Pub. No.: WO2012/171547
PCT Pub. Date: Dec. 20, 2012

(65) Prior Publication Data
US 2014/0142811 A1 May 22, 2014

(30) Foreign Application Priority Data

Jun. 15, 2011 (DE) .......................... 10 2011 106 520

(51) Int. Cl.
| *A01B 69/00* | (2006.01) |
| *G08G 1/16* | (2006.01) |
| *B60T 7/04* | (2006.01) |
| *B60T 7/22* | (2006.01) |
| *B60T 8/32* | (2006.01) |
| *B60W 10/184* | (2012.01) |
| *B60W 10/20* | (2006.01) |
| *B60W 30/09* | (2012.01) |
| *B60W 30/095* | (2012.01) |
| *B60W 30/08* | (2012.01) |

(52) U.S. Cl.
CPC . *G08G 1/16* (2013.01); *B60T 7/042* (2013.01); *B60T 7/22* (2013.01); *B60T 8/3275* (2013.01); *B60W 10/184* (2013.01); *B60W 10/20* (2013.01); *B60W 30/09* (2013.01); *B60W 30/0953* (2013.01); *B60W 30/08* (2013.01); *B60W 2540/12* (2013.01)
USPC .......................................................... 701/41

(58) Field of Classification Search
None
See application file for complete search history.

(56) References Cited

U.S. PATENT DOCUMENTS

| 6,624,747 B1 | 9/2003 | Friederich et al. |
| 2007/0131468 A1* | 6/2007 | Bullinger et al. ............. 180/282 |

(Continued)

FOREIGN PATENT DOCUMENTS

| DE | 198 06 687 A1 | 8/1999 |
| DE | 103 49 211 A1 | 5/2005 |

(Continued)

OTHER PUBLICATIONS

International Search Report with English translation dated Aug. 29, 2012 (5 pages).
German-language Written Opinion dated Aug. 29, 2012 (6 pages).

*Primary Examiner* — Thomas Tarcza
*Assistant Examiner* — Adam Alharbi
(74) *Attorney, Agent, or Firm* — Crowell & Moring LLP

(57) ABSTRACT

A method for preventing a collision of a vehicle involves continuously detecting an operation of a brake pedal of the vehicle and concluding a risk of collision if the brake pedal is operated quickly. A position and a movement of objects in the vehicle surroundings relative to the vehicle are detected and evaluated regarding the risk of collision. When a risk of collision has been detected, an evasion maneuver of the vehicle is automatically carried out, if the evaluation of the risk of collision reveals that a collision can be prevented by an evasion maneuver but not by a braking manoeuvre.

9 Claims, 2 Drawing Sheets

(56) References Cited

U.S. PATENT DOCUMENTS

Figure 1:
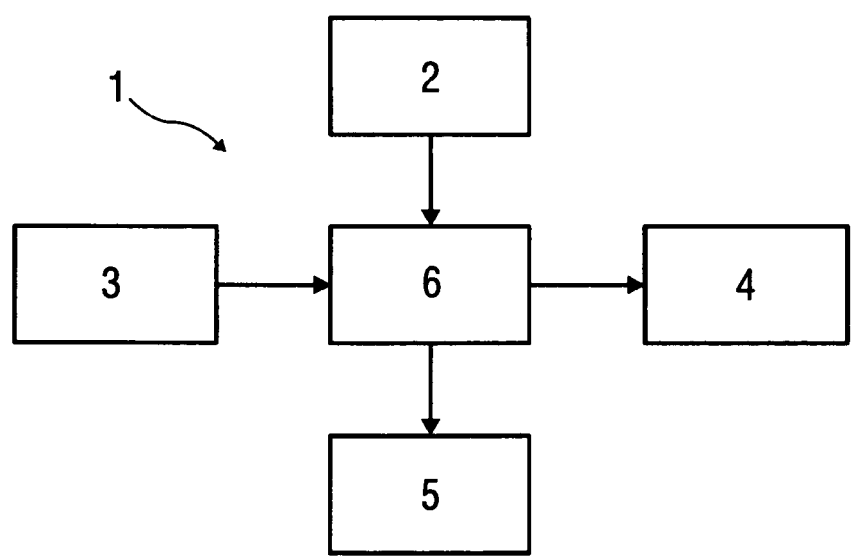

2007/0211919 A1* 9/2007 Nagaoka et al. .............. 382/104
2009/0041302 A1* 2/2009 Nagaoka et al. .............. 382/103
2010/0006363 A1 1/2010 Zagorski

FOREIGN PATENT DOCUMENTS

| DE | 10 2004 056 027 A1 | 5/2006 |
| EP | 1 057 159 B1 | 5/2002 |
| EP | 1 990 250 A2 | 11/2008 |

* cited by examiner

METHOD FOR PREVENTING A COLLISION OF A VEHICLE AND DRIVER ASSISTANCE SYSTEM FOR A VEHICLE

BACKGROUND AND SUMMARY OF THE INVENTION

Exemplary embodiments of the present invention relate to a method to prevent a collision of a vehicle and a driver assistance system for a vehicle to carry out the method.

Such methods and driver assistance systems are already known. European patent document EP 1 057 159 B1 discloses a method to prevent a collision of a vehicle with an obstacle arranged before the vehicle. In the method, a first distance between the vehicle and the obstacle is calculated, which is at least required in order to prevent a collision of the vehicle with the obstacle through a braking procedure with maximum deceleration. Furthermore, a second distance is calculated, which is at least required in order to prevent a collision of the vehicle with the obstacle through steering the vehicle past the obstacle. An automatic braking procedure is then only initiated if the detected distance is both smaller than the first calculated distance and smaller than the second calculated distance, i.e. if the driver can neither prevent the collision by braking nor by deviation, and if the degree of contact of the vehicle relative to the obstacle exceeds a predetermined threshold. A driver activity, a status of a road, a loading condition and the degree of contact of the vehicle relative to the obstacle are included in the calculation.

German patent document DE 10 2004 056 027 A1 discloses a method to prevent collisions or lessen the severity of a collision of a vehicle with the steps: detecting the speed and the direction of movement of the vehicle; detecting the position of objects in the vehicle surroundings; detecting the speed and the direction of movement of the objects relative to the vehicle; predicting the future position of the objects relative to the vehicle; evaluating the present and future positions of the objects relative to the vehicle; emitting a warning to the driver and/or carrying out an automatic steering and/or braking intervention through an assistance system of the vehicle, depending on the evaluation, if a collision with the object is inevitable without a system intervention according to the evaluation. The evaluation is based on the calculation of two action time periods (time-to-brake and time-to-avoid), the remaining time until the last moment for the initiation of a braking intervention to prevent collision or for the initiation of an evasion maneuver to prevent collision.

Exemplary embodiments of the present invention are directed to an improved method to prevent a collision of a vehicle, as well as a driver assistance system for a vehicle to carry out the method.

In the method according to the invention to prevent a collision of a vehicle, an operation of a brake pedal of the vehicle is continuously detected and a risk of collision is concluded if the brake pedal is operated with an operating speed, which exceeds a predetermined minimum operating speed, and at an operating value, which exceeds a predetermined minimum operating value. Furthermore, a position and a movement of objects in the vehicle surroundings relative to the vehicle are detected and evaluated regarding the risk of collision. When a risk of collision has been detected, an evasion maneuver of the vehicle is automatically carried out if the evaluation of the risk of collision reveals that a collision can be prevented by an evasion maneuver but not by a braking maneuver.

According to the invention, an automatic evasion maneuver of the vehicle is thus initiated if a threatening collision is recognized, which can only still be prevented through an evasion maneuver, but no longer through a braking maneuver. According to the invention, braking maneuvers thus take preference over evasion maneuvers. Thus it is advantageously taken into account that evasion maneuvers are, as a rule, more risky than braking maneuvers, as an evasion maneuver can cause further risks of collision, for example with on-coming traffic, and can more easily lead to the driver losing control of the vehicle.

According to the invention, a risk of collision is furthermore recognized through a quick operation of the brake pedal of the vehicle and is evaluated due to the position and movement of objects in the vehicle surroundings. Therein it is assumed that a quick operation of the brake pedal signals a danger of collision, as drivers tend to prevent a threatening collision through sharp braking Through the detection and evaluation of the position and movement of objects in the vehicle surroundings, it can be advantageously calculated whether the risk of collision actually exists and whether it can be prevented by braking or evasion of the vehicle.

BRIEF DESCRIPTION OF THE DRAWING FIGURES

Exemplary embodiments of the invention are illustrated in greater detail by means of drawings.

Figure 2:
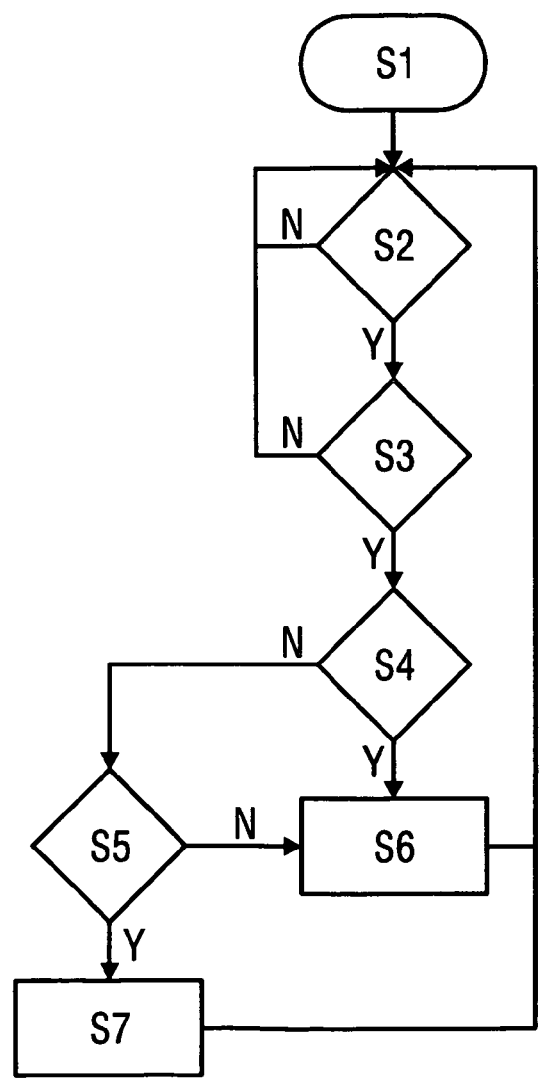

Here are shown:

FIG. 1 a block diagram of a driver assistance system to prevent a collision of a vehicle according to the method according to the invention and FIG. 2 a flow chart of a method according to the invention to prevent a collision of a vehicle.

DETAILED DESCRIPTION

FIG. 1 shows a block diagram of a driver assistance system 1 to prevent a collision of a vehicle according to a method according to the invention. The driver assistance system 1 comprises at least one environmental sensor 2 e.g. a radar, LIDAR, video or ultrasound sensor, to detect the position and movement of objects in the vehicle surroundings relative to the vehicle, a brake pedal sensor 3 to detect an operating speed and an operating value of a brake pedal of the vehicle, a steering assistant 4 to automatically steer the vehicle, a braking assistant 5 to automatically influence a braking system of the vehicle as well as a control unit 6 to evaluate the risk of collision by means of signals of the at least one environmental sensor 2, to analyze the signals of the brake pedal sensors 3 and to control the steering assistant 4 and the braking assistant 5.

FIG. 2 shows a flow diagram of a method according to the invention.

In the method, the driver assistance system 1 is activated in a first method step 51. The activation preferably occurs automatically when the vehicle is started.

In a second method step S2, the position and movement of objects in the vehicle surroundings are detected by means of the at least one environmental sensor 2. Furthermore, an operating speed and an operating value of the brake pedal are detected by means of the brake pedal sensor 3. The signals detected by the environmental sensor 2 and the brake pedal sensor 3 are transmitted to the control unit 6 and it is checked by means of the control unit 6 whether the detected operating speed of the brake pedal exceeds a predetermined minimum operating speed or whether the detected operating value exceeds a predetermined minimum operating value.

If the detected operating speed of the brake pedal does not exceed the predetermined minimum operating speed or the detected operating value does not exceed a predetermined minimum operating value, the second method step S2 is repeated. Otherwise, a third method step S3 is carried out.

In the third method step S3, it is checked by means of the control unit 6, using the signal detected by the environmental sensor 2, whether there is a threat of a collision of the vehicle with the object in the vehicle surroundings. In particular, it is checked whether an object causing a risk of collision is located in the vehicle surroundings and how such an object moves relative to the vehicle. In order to check this, methods are used, which are known for example from German patent document DE 10 2004 056 027 A1 and therefore are not illustrated in greater detail here.

If the result of the third method step S3 is that there is no threat of collision, the method continues with the second method step S2. Otherwise, a fourth method step S4 is carried out.

In the fourth method step S4, it is checked whether the threatening collision can still be prevented by a braking maneuver. To that end, it is calculated whether the collision can be prevented through a braking maneuver with a predetermined maximum deceleration. Optionally, a braking action time period (so called time-to-brake) is additionally calculated, which indicates a time period in which a braking maneuver must be initiated in order to prevent a collision, i.e. a time period, which still remains until the last moment in which braking must be initiated in order to still prevent the collision.

If the result of the fourth method step S4 is that the threatening collision can no longer be prevented by a braking maneuver, a fifth method step S5 is carried out. Otherwise the braking assistant 5 to prevent collision is activated in a sixth method step S6.

In the fifth method step S5, it is checked whether the collision can be prevented through a sufficiently safe evasion maneuver. To that end, a maximum lateral acceleration is calculated, which would result from an evasion maneuver initiated at a predetermined safety distance to the object and the calculated maximum lateral acceleration is compared with a predetermined threshold value. It is thus concluded that the collision can be prevented through a sufficiently safe evasion maneuver if the calculated maximum lateral acceleration is smaller than the threshold value. Otherwise it is thus concluded that the collision cannot be prevented through a sufficiently safe evasion maneuver. The threshold value indicates a value of the lateral acceleration, which should not be exceeded, so that the deviation maneuver can be carried out stably.

Optionally in the fifth method step S5, an evasion action time period (so called time-to-avoid) is additionally calculated, which indicates a period of time in which an evasion maneuver must be initiated in order to prevent a collision, i.e. a period of time, which still remains until the last moment in which the evasion maneuver must be initiated in order to still prevent a collision through evasion.

If the result of the fifth method step S5 is that the threatening collision can no longer be prevented by a sufficiently safe evasion maneuver, the sixth method step S6 is carried out, i.e. the braking assistant 5 is activated to lessen the severity of the accident. Otherwise, a seventh method step S7 is carried out.

In the seventh method step S7, an evasion maneuver controlled by means of the control unit 6 is automatically carried out. Therein the transverse movement of the vehicle is effected by means of the steering assistant 4 through a steering intervention, a braking intervention (single wheel braking) or a chassis tension.

In an embodiment of the seventh method step S7, an impact of the operation of the brake pedal on a braking deceleration of the vehicle is reduced or completely eliminated during the automatic evasion maneuver. Thus, a braking of the vehicle is reduced or prevented during the yawing and thus the driving stability of the vehicle is advantageously increased during the evasion maneuver.

After the sixth method step S6, and after the seventh method step S7, the method continues with the second method step S2.

The method is ended if the driver assistant system 1 is switched off. This preferably occurs automatically if the vehicle is stopped. Furthermore, it can be provided that the driver assistance system 1 can additionally be manually switched off.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method to prevent a collision of a vehicle, the method comprising:
    detecting a position and a movement of objects in surroundings of the vehicle relative to the vehicle;
    continuously detecting an operation of a brake pedal of the vehicle; and
    evaluating a risk of collision with the detected objects, wherein the risk of collision is concluded if the brake pedal is operated with an operating speed exceeding a predetermined minimum operating speed and at an operating value exceeding a predetermined minimum operating value,
    wherein depending on the evaluation of the risk of collision, an intervention in a braking system or steering system of the vehicle is carried out if, according to the evaluation, a collision of the vehicle with an object is unavoidable without a system intervention,
    wherein when the risk of collision has been concluded, an evasion maneuver is automatically carried out if the evaluation of the risk of collision reveals that a collision can be avoided by an evasion maneuver but not by a braking maneuver.

2. The method according to claim 1, wherein in the evaluation of the risk of collision, a first evaluation criterion that is calculated is whether a collision can be prevented by a braking maneuver with a predetermined maximum deceleration, and the first evaluation criterion is used to decide whether the collision can be prevented by a braking maneuver.

3. The method according to claim 1, wherein in the evaluation of the risk of collision, a braking action time period is calculated, which indicates a time period within which a braking maneuver must be initiated in order to avoid a collision, and it is decided by means of the calculated braking action time period whether the collision can be prevented by a braking maneuver.

4. The method according to claim 2, wherein in the evaluation of the risk of the collision, a second evaluation criterion to be calculated is whether the vehicle can avoid the object at a predetermined safe distance, and that the second evaluation criterion is used in order to decide whether the collision can be prevented by an evasion maneuver.

5. The method according to claim 4, wherein a maximum transverse acceleration is determined, which would result from an evasion maneuver initiated at a safe distance from the object, and the determined maximum transverse acceleration is compared to a predetermined threshold value, and it is concluded that the collision can be prevented through an evasion maneuver if the determined maximum transverse acceleration is smaller than the threshold value, and it is concluded that the collision cannot be prevented by an evasion maneuver if the calculated maximum transverse acceleration is larger than the threshold value.

6. The method according to claim 1, wherein in the evaluation of the risk of collision, an evasion action time period is calculated, which indicates a time period within which an evasion maneuver must be initiated in order to avoid a collision, and it is decided by means of the calculated evasion action time period whether the collision can be prevented by an evasion maneuver.

7. The method according to claim 1, wherein the automatic evasion maneuver is carried out by an automatic steering intervention, an automatic braking intervention, or an automatic chassis tension.

8. The method according to claim 1, wherein an influence of the operation of the brake pedal on the braking deceleration of the vehicle is reduced during the automatic evasion maneuver.

9. A driver assistance system for a vehicle, comprising:
   at least one environmental sensor configured to detect positions and movement of objects in surroundings of the vehicle relative to the vehicle;
   at least one brake pedal sensor configured to detect an operating speed and an operating value of the brake pedal;
   a steering assistant configured to automatically steer the vehicle; and
   a control unit configured to evaluate a risk of collision using signals of the at least one environmental sensor and to control the steering assistant, wherein signals detected by the at least on brake pedal sensor are able to be transmitted to the control unit and are able to be evaluated by the control unit, and
   wherein the control unit is configured to conclude there is the risk of collision if the brake pedal is operated with an operating speed exceeding a predetermined minimum operating speed and at an operating value exceeding a predetermined minimum operating value,
   wherein depending on the evaluation of the risk of collision, the control unit is configured to initiate an intervention in a braking system or steering system of the vehicle if, according to the evaluation, a collision of the vehicle with an object is unavoidable without a system intervention,
   wherein when the risk of collision has been concluded, the control system is configured to automatically initiate an evasion maneuver if the evaluation of the risk of collision reveals that a collision can be avoided by an evasion maneuver but not by a braking maneuver.

* * * * *